(12) United States Patent
Samdadiya et al.

(10) Patent No.: US 9,690,901 B1
(45) Date of Patent: Jun. 27, 2017

(54) ENHANCED PRIVACY WITH FEWER COOKIES

(75) Inventors: Parag Samdadiya, Kirkland, WA (US); Clyde D. McQueen, III, Seattle, WA (US)

(73) Assignee: Google Inc., Mountain View, CA (US)

( * ) Notice: Subject to any disclaimer, the term of this patent is extended or adjusted under 35 U.S.C. 154(b) by 735 days.

(21) Appl. No.: 12/328,671

(22) Filed: Dec. 4, 2008

Related U.S. Application Data

(60) Provisional application No. 60/992,289, filed on Dec. 4, 2007.

(51) Int. Cl.
*G06Q 30/00* (2012.01)
*G06F 17/00* (2006.01)

(52) U.S. Cl.
CPC .................................. *G06F 17/60* (2013.01)

(58) Field of Classification Search
USPC .......................................................... 705/14
See application file for complete search history.

(56) References Cited

U.S. PATENT DOCUMENTS

| | | | |
|---|---|---|---|
| 6,009,410 | A | 12/1999 | LeMole et al. |
| 7,124,115 | B1 | 10/2006 | Herzberg |
| 2004/0024632 | A1* | 2/2004 | Perry ............................. 705/10 |
| 2005/0033641 | A1* | 2/2005 | Jha et al. ....................... 705/14 |
| 2005/0273388 | A1* | 12/2005 | Roetter .......................... 705/14 |
| 2006/0282327 | A1 | 12/2006 | Neal et al. |
| 2007/0220040 | A1 | 9/2007 | Do |
| 2007/0260520 | A1* | 11/2007 | Jha et al. ....................... 705/14 |
| 2008/0189181 | A1* | 8/2008 | Zorman et al. ................ 705/14 |
| 2008/0201401 | A1* | 8/2008 | Pugh et al. .................... 709/201 |
| 2011/0252465 | A1 | 10/2011 | Miller et al. |

OTHER PUBLICATIONS

U.S. Appl. No. 12/102,622, filed Apr. 14, 2008, Privacy-Sensitive Cookies, Ranganath et al.
Office Action issued in U.S. Appl. No. 13/544,336 on Nov. 7, 2012, 13 pages.
Office Action issued in U.S. Appl. No. 13/544,336 on Jun. 14, 2013, 17 pages.
Office Action issued in U.S. Appl. No. 14/088,769 on Apr. 6, 2016, 17 pages.

* cited by examiner

*Primary Examiner* — Alvin L Brown
(74) *Attorney, Agent, or Firm* — Fish & Richardson P.C.

(57) ABSTRACT

Aspects relating to client server interactions using cookies are provided. A computer-implemented method is provided that includes receiving a request from a user for a first advertisement associated with a first advertiser, the request including first cookie data, the first cookie data including a first identifier specified for a first cookie, the first cookie being associated with a first group of advertisers including the first advertiser and a third advertiser, receiving a request from the user for a second advertisement associated with a second advertiser, the request including second cookie data, the second cookie data including a second identifier specified for a second cookie, the second cookie being associated with a second group of advertisers including the second advertiser and where the advertisers of the second group of advertisers are distinct from the advertisers of the first group of advertisers.

19 Claims, 8 Drawing Sheets

*350*

*Prior Art*

| Adv = Adv #1  |
| Ad = Ad #1    |
| Cookie = 12345 |
| *352* |

| Adv = Adv #2  |
| Ad = Ad #2    |
| Cookie = 12345 |
| *354* |

| Adv = Adv #11 |
| Ad = Ad #3    |
| Cookie = 12345 |
| *356* |

| Adv = Adv #1  |
| Ad = Ad #1    |
| Cookie = 98765 |
| *358* |

| Cookie | Advertiser # | | Hashed Value |
|---|---|---|---|
| 12345 | 1 | = | 15000 |
| 12345 | 2 | = | 15500 |
| 12345 | 3 | = | 16000 |

| Adv = Adv #1
Ad = Ad #1
Cookie = 15000
*762* |

| Adv = Adv #2
Ad = Ad #2
Cookie = 15500
*764* |

| Adv = Adv #3
Ad = Ad #3
Cookie = 16000
*766* |

ENHANCED PRIVACY WITH FEWER COOKIES

CROSS-REFERENCE TO RELATED APPLICATIONS

This application is a non-provisional application of and claims the benefit under 35 U.S.C. §119(e) to U.S. Provisional Application Ser. No. 60/992,289, filed on Dec. 4, 2007.

BACKGROUND

This specification relates to cookies that can be used to identify a client or user in Internet interactions.

Generally, the term "cookie" is used to refer to HTTP (Hypertext Transport Protocol) or web cookies. However, the term will be used in this specification in a broader sense to include any collection of information, whether stored in a file or otherwise, provided by a web site to be stored on a client device. Generally, a cookie includes information about an individual's or the client's use of a web site. Thus, the term includes not only conventional web cookies but also other technologies, e.g., "Local Shared Object," which are also known as a "Flash cookies."

When an advertisement is downloaded from an ad server by a user's browser, a cookie, associated with the ad server, is provided by the ad server to the browser. The cookie can be used to track how many unique browsers have downloaded the advertisement and how many times the advertisement has been downloaded by any one user's browser. An advertiser can incorporate content from the ad server into a particular web page (e.g., a merchandise buy page) typically referred to as a conversion page. When the user visits the advertiser's conversion page, the information in the cookie is provided to the ad server when the content is downloaded by the user's browser.

Ad servers often serve multiple advertisements for a variety of advertisers. In some systems, a single cookie associated with the ad server is used identify a user with respect to all advertisements served by the ad server.

SUMMARY

Systems, methods, and computer program products for client server interactions using cookies are provided. In general, one aspect of the subject matter described in this specification can be embodied in methods that include the actions of receiving a request from a user for a first advertisement associated with a first advertiser, the request including first cookie data, the first cookie data including a first identifier specified for a first cookie, the first cookie being associated with a first group of advertisers including the first advertiser and a third advertiser; sending the first advertisement to the user and logging the received first cookie identifier; receiving a request from the user for a second advertisement associated with a second advertiser, the request including second cookie data, the second cookie data including a second identifier specified for a second cookie, the second cookie being associated with a second group of advertisers including the second advertiser where the advertisers of the second group of advertisers are distinct from the advertisers of the first group of advertisers; and sending the second advertisement to the user and logging the second cookie identifier. Other embodiments of this aspect include corresponding systems, apparatus, and computer program products.

These and other embodiments can optionally include one or more of the following features. The method further includes associating each of multiple advertisers with one of a limited set of two or more cookies where the number of advertisers is greater than the number of cookies. The method further includes sending a cookie of the limited set of two or more cookies to a user in response to a request for a particular advertisement associated with that cookie, the particular advertisement being associated with one of the advertisers. Each advertiser is associated with a one of a limited number of domains where the number of domains corresponds to the number of cookies and where each cookie of the limited number of cookies is associated with a particular domain. Each identifier is used to uniquely identify a browser to the particular group of advertisers associated with the cookie. The cookie identifiers are logged to record activity of a browser according to the particular group of advertisers. The method further includes providing the client with two or more cookies in response to requests for advertisements, each cookie being associated with a distinct group of advertisers.

In general, one aspect, of the subject matter described in this specification can be embodied in methods that include the actions of receiving from a user cookie data and an advertiser identifier, the cookie data including a unique identifier specified for the cookie; applying a non-reversible function to generate an advertiser specific cookie identifier from the unique user identifier and the advertiser identifier; and using the advertiser-specific cookie identifier to record advertiser related activity of the user.

Other embodiments of this aspect include corresponding systems, apparatus, and computer program products.

These and other embodiments can optionally include one or more of the following features. The non reversible function is an implementation of an SHA (Secure Hash Algorithm) hash algorithm on an input comprising the unique identifier and the advertiser identifier. The unique identifier uniquely identifies a particular browser. Recording advertiser-related activity includes recording user requests for particular advertisements associated with particular advertisers where the recording does not identify a browser associated with the user request.

In general, one aspect, of the subject matter described in this specification can be embodied in methods that include the actions of receiving from a user multiple pairs of a user cookie and an advertiser identifier, the cookie of each pair including a unique identifier identifying the cookie, each cookie being associated with one of multiple distinct groups of advertisers and the advertiser identifier of each pair corresponding to a particular advertiser of a particular group of advertisers; applying a one-way algorithm to generate an advertiser-specific cookie identifier from each of the unique identifier and the advertiser identifier, thereby generating multiple advertiser-specific cookie identifiers; and using the multiple advertiser-specific cookie identifiers to determine advertiser related activity of the user as one way to increase user privacy protection.

Other embodiments of this aspect include corresponding systems, apparatus, and computer program products.

Particular embodiments of the invention can be implemented to realize one or more of the following advantages. The total amount of ad history that can be attributed to unique browsers can be limited.

The details of one or more embodiments of the invention are set forth in the accompanying drawings and the descrip-

BRIEF DESCRIPTION OF THE DRAWINGS

FIG. 3 shows an example prior art web server log.

FIG. 5 shows a table of example values that may be used in a hashing process.

FIG. 7 shows an example web server log.

Like reference numbers and designations in the various drawings indicate like elements.

DETAILED DESCRIPTION

Figure 1:
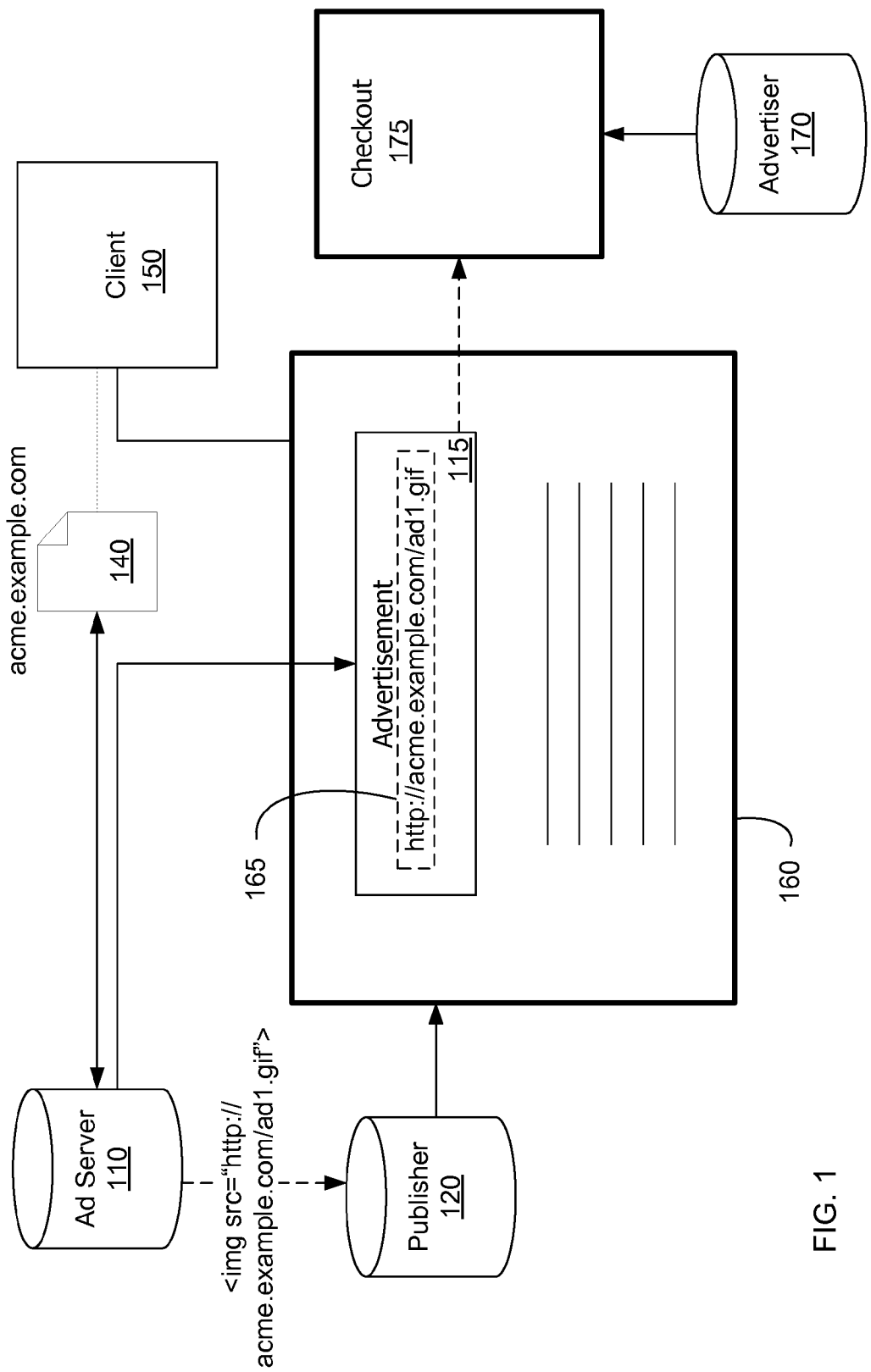
FIG. 1 shows a diagram illustrating interactions among an example ad server, an example publisher, and an example client.

FIG. 1 is a diagram illustrating interactions among an example ad server 110, an example publisher 120 and an example client 150. Although a single ad server is referred to in the following description, the ad server can be implemented as a system of one or more servers (e.g., a load-balancing server farm or cluster) that include varying server components (e.g., web servers and DNS (domain name system) servers. An ad server 110 hosts advertisements that can be provided to publishers 120 of web content. Advertisements can include images, text, multimedia, scripts or a combination thereof.

A publisher 120 provides published content of its own (e.g., information, news, web logs or web services), but can also incorporate third-party content, typically advertisements, which are hosted on a third-party sever, typically the ad server. In some alternative implementations, the publisher 120 uses a publisher ad server to manage and present ads. Generally, when an advertisement is provided to the publisher 120, the publisher 120 is provided with a reference to the advertisement hosted on the ad server 110. The reference can be a universal resource locator (URL), which includes a hostname identifying the ad server and a particular advertisement (e.g., 'http://adserver.example.com/advertizement1.gif'). Alternatively, a particular advertisement can be identified using code (e.g., javascript, html, or other scripting language). The publisher incorporates the advertisement into published content by including the reference in the published content.

The published content 160, including the reference 165, is received by a client 150 (e.g., a web browser). The client uses the reference 165 to request and download the advertisement 115 from the ad server 110. The client typically renders and displays the published content 160, including the advertisement 115, to a user. The advertisement itself may address (i.e., include a link to) another location independent of the ad server 110. For example, a user clicking on the advertisement can cause the client to navigate to another page 175 provided, for example, by the advertiser 170.

The first time a client downloads content from the ad server, the ad server provides a cookie 140, which includes a unique identifier, to the client 150. The content of the cookie is stored by the client. In general, web browsers prevent servers from storing arbitrarily large amounts of information in a single cookie or associating many (e.g., more than 20 or 50) separate cookies with any particular hostname.

Figure 2:
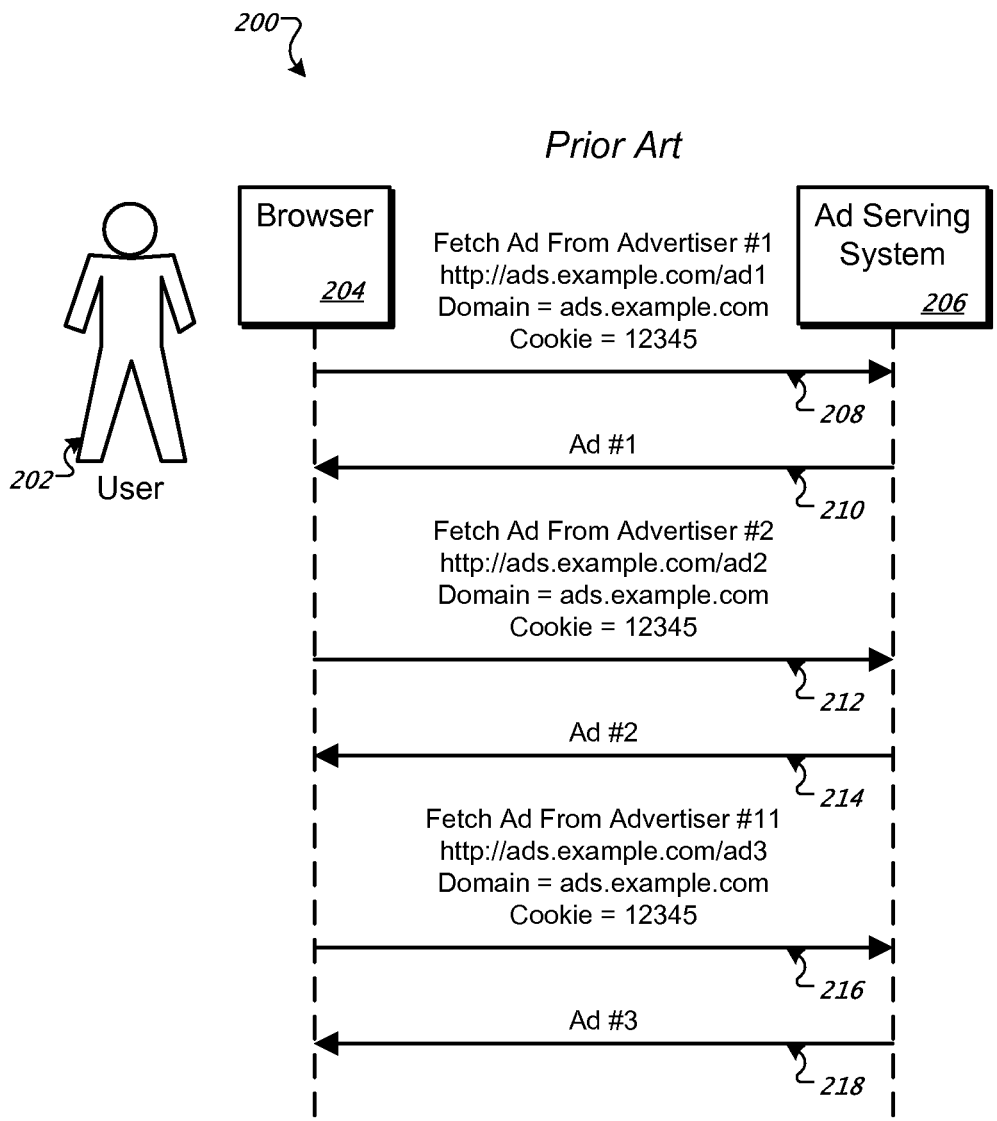
FIG. 2 shows an example conventional process for determining Internet advertisements.

FIG. 2 shows an example process 200 for determining Internet advertisements. For convenience, the process 200 is described with respect to an ad serving system 206. Generally speaking, ad serving systems serve advertisements (ads) to web browsers, and record a log of the browsers' activities. In some implementations, these logs are used to calculate the value of the ad serving system's services. For example, by identifying the number of hits a particular ad receives, the operator of an ad serving system can determine the effectiveness of various ads or calculate the rate to charge advertisers for serving their ads, among other things.

In some implementations, the ad serving system identifies the activities of various users (e.g., based on the activity of particular browsers associated with the users) to determine the shopping behaviors of the users who are browsing various websites. For example, if a user follows a link to an ad for peanut butter and another ad for jelly, the ad serving system can determine that the user may be a good target for an ad for bread.

Typical ad serving systems identify individual browsers (which can be used in some cases to infer the identity of particular users) through the use of Internet cookies. When a user browses a website that includes a reference to an advertisement, the ad serving system can provide a cookie to the browser along with the advertisement to be displayed with the website. The cookie includes a values set by the ad server. The cookie value is sent by the browser back to the ad server each time the browser requests an ad from the ad server. In some implementations, cookies allow the ad serving system to identify individual browsers associated with one or more users and remember the individual browsers between web browsing sessions. For example, the ad serving system may record that a browser, identified by a cookie value, has browsed several ads for baby gear during one session. The next time the browser (e.g., as used by a particular user) browses a website including an advertisement served by the ad serving system, the cookie value can be sent to allow the ad serving system to identify the browser and recall the apparent interests of the browser user, and use that information to serve the user more ads for baby gear.

The ad serving system 206 receives a request to fetch an ad from advertiser #1. For example, the ad serving system 206 can receive the request from a user 202 interacting with a browser 204. The Internet address of the ad is illustrated as "http://ads.example.com/ad1." Before the request is received by the ad serving system 206, the browser 204 can use the domain of the ad (e.g., "ads.example.com") to look up a cookie value to send to the ad serving system 206 along with the request to fetch the ad. In the illustrated example, the cookie value for the domain "ads.example.com" is "12345." The ad serving system 206 sends 210 the requested ad #1 to the browser 204. The ad serving system 206 also logs various types of information about the request, for example, the identity of the advertiser, the identity of the advertisement that was sent, the identity of the browser 204, or other various types of information that may be used to record ad serving operations. This log is further described in reference to FIG. 3.

The ad serving system 206 receives 212 another request from the browser 204 to fetch an ad from advertiser #2 from the domain "ads.example.com" with the cookie value "12345." The ad serving system 206 responds by sending 214 ad #2, and logging the action. Similarly, the ad serving system 206 receives 216 a request from the browser 204 for an ad from advertiser #11 using the cookie value "12345". The ad serving system 206 sends 218 ad #3 in response to the request and logs the activity.

FIG. 3 shows an example ad server log 350. The ad server log 350 includes four log entries, a log entry 352, a log entry 354, a log entry 356, and a log entry 358. Each of these log entries includes some of information that can be recorded in the log of an ad serving system e.g., the as serving system 206 of FIG. 2.

The log entry 352 represents an example of the data that can be recorded by the ad serving system 206 when responding to a request for an ad. The ad server log 350 records the identity of the advertiser, the identity of the served ad, and the cookie value of the browser 204 that requested the ad. Similarly, the log entries 354 and 356 illustrate some of the values logged when responding to additional ad requests from the user 202. The log entry 358, however, illustrates that the ad #1 from advertiser #1 was served to a browser other than the browser 204, as indicated by the cookie value "98765," which uniquely identifies a different browser than the cookie value "12345".

In some implementations, individual logs can be compared. However, the operator of an ad serving system may wish to prevent such log comparisons in order to protect the privacy of its users.

Figure 4:
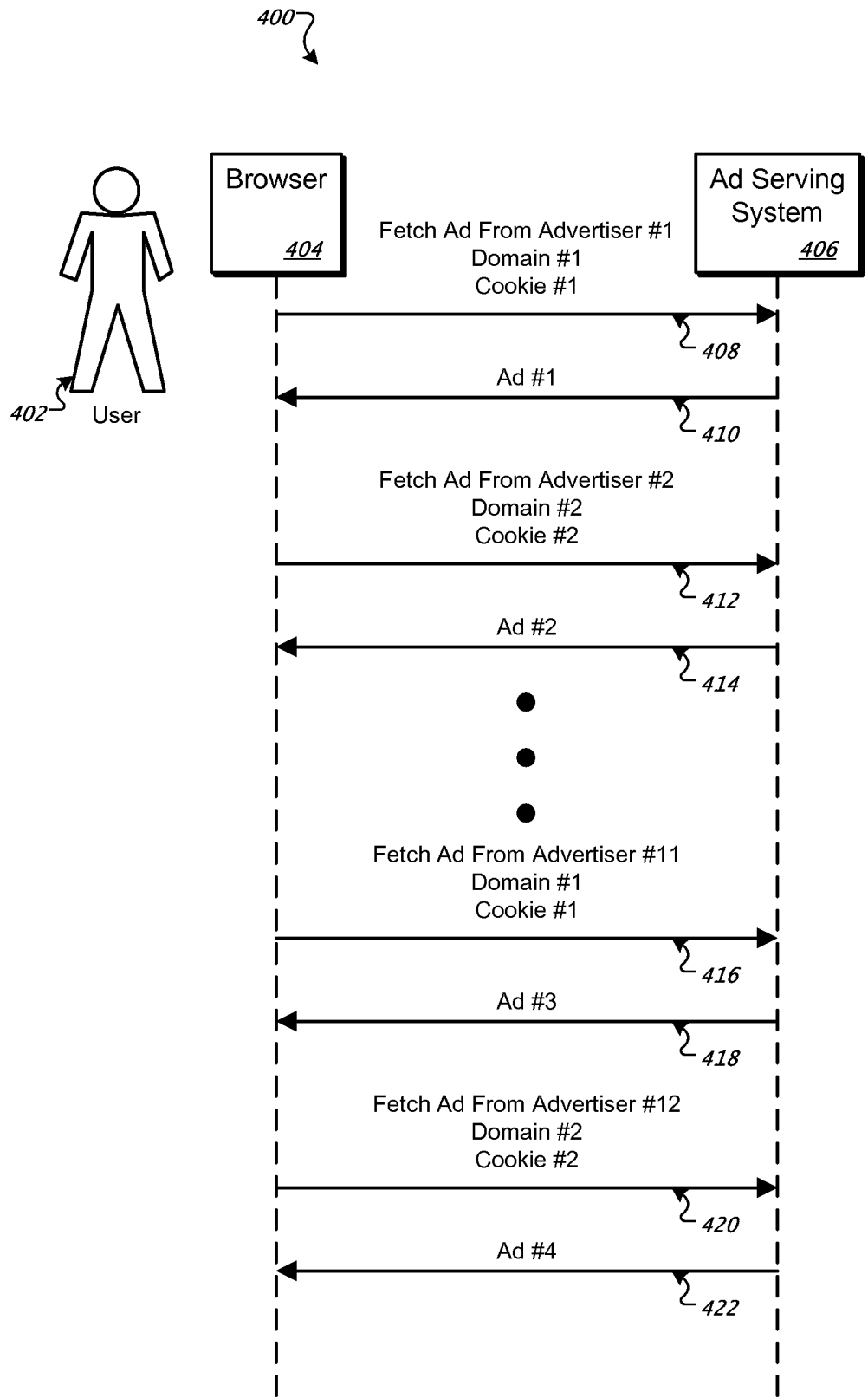
FIG. 4 shows an example process for associating a number of Internet cookies with a number of Internet advertisements.

FIG. 4 shows an example process 400 for associating a limited number of Internet cookies with a number of Internet advertisements. The process 400 will be described as carried out by an ad serving system 406. In general, the ad serving system 406 obfuscates the identity of a particular browser 404 (and therefore user 402) by distributing to the browser 404 a number of cookies each having a unique value.

The process 400 allows the ad serving system 406 to serve ads while reducing the ability of advertisers or others, including the ad serving system 406, to combine ad server log information to extract extra information about the user 402 using information about browser 404. In some implementations, the browser 404 can access several cookies received previously from the ad serving system 406 (e.g., ten cookies) where each cookie includes a reference to the ad server corresponding to one or more advertisers.

The browser 404 sends the ad serving system 406 a request 408 to fetch an ad from advertiser #1 at a domain #1. The browser 404 request also includes the value for a cookie #1 that can be used by the ad serving system 406. The value of cookie #1 is sent by the browser 404 because cookie #1 references the same domain #1 as the requested ad. In particular, the ad server assigned Advertiser #1 to domain #1 and domain #1 is associated with cookie #1. The ad serving system 406 sends a reply at step 410 by returning the ad #1, which is incorporated by the browser 404 into, e.g., a particular web page. In some implementations, the ad serving system 406 logs the identities of the ad served and the value from cookie #1.

The ad serving system 406 receives 412 a request from the browser 404 to fetch an ad from advertiser #2 at a domain #2, where the request includes the value for a cookie #2. The value of cookie #2 is sent by the browser 404 because cookie #2 references the same domain #2 as the requested ad. The ad serving system 406 responds 414 to the request by returning the ad #2. In some implementations, the ad serving system 406 logs the identities of the ad served and the value from cookie #2.

The ad serving system 406 has received requests from a single browser 404 for two different ads using two different cookie values. In some implementations, an algorithm can be used to determine which cookie of a group of cookies should be sent by the browser when requesting an ad from a particular advertiser. In particular, using some distribution algorithm, advertisers can assign to different domains and hence different cookies because each domain uses a different cookie. For example, the ad serving system 406 can map an identifier (e.g., a number) of each advertiser to a small range of numbers to determine which cookie of the group of browser cookies to associate with that advertiser (e.g., by assigning the ads for the advertiser #1 to be served from the domain #1, which is associated with the cookie #1; by assigning the ads for the advertiser #11 to be served from the domain #1, which is associated with the cookie #1; and by assigning ads for the advertiser #26 to be served from the domain #6 which is associated with the cookie #6). In this example, a small number of cookies (e.g., ten) can be associated with any number of advertisers without positively identifying the browser 402 to all the advertisers.

While the example process 400 is described using a modulo ten method (i.e., advertiser-id modulo 10 determines which domain, and hence cookie, is associated with the advertiser), other methods exist. The user cookie that is associated with an advertiser may be assigned by other kinds of mappings, by a random process, or by a dynamic process (e.g., the cookie used may change depending on the date, the hour of the day, the minute).

While the process 400 is described as using ten cookies, other numbers of cookies may be used. For example, the identity of the advertiser may be hashed or otherwise processed to reproducibly generate a representation within a predetermined range of values.

As shown in FIG. 4, the ad serving system 406 receives 416 a request from the browser 404 to fetch an ad from the advertiser #11 at the domain #1. Since advertiser #11 is assigned to domain #1, the ad serving system 406 serves the ad from the domain #1, therefore the request 416 is sent to the domain #1 and includes the value of cookie #1. Cookie #1 includes a reference to domain #1, which is also associated with advertiser #11. The ad serving system 406 sends 418 a reply by returning a web page that includes an ad #3 from advertiser #11. In some implementations, the ad serving system 406 logs the identity of the ad served in the reply message and the value from cookie #1.

The ad serving system 406 receives 420 a request from the browser 404 to fetch an ad from advertiser #12 at domain #2. Since advertiser #12 is assigned to domain #2, the request includes the value of cookie #2. The ad serving system 406 sends 422 a reply message by returning a web page that includes an ad #4. In some implementations, the ad serving system 406 logs the identity of the ad served in the reply message and the value from cookie #2.

In some implementations, the identity of the browser 404 (and any associated users 402) is obfuscated by distributing multiple cookies. In the illustrated example, anyone (e.g., individuals or systems) having access to the server logs is not be able to determine that the browser 404 browsed both ad #1 and ad #2 since the browsing activities of the user 402 were logged using cookie #1 and cookie #2, respectively. Since the browser 404 is identified differently in the logs of advertiser #1 and advertiser #2, those having access to both logs are not be able to draw any additional information about the user 402 by comparing their individual logs.

In some implementations, domains associated with the advertisers are dynamically generated (e.g., the particular domain that each group of advertisers is assigned to). Several advertisers and their advertisements, which are generally stored and hosted by the ad server, are identified. Hostnames are dynamically generated for each group of advertisers. In some implementations, the dynamically generated hostnames are sub-domains of the ad server's domain name. For example, if the domain name of the ad server is adserver.example.com, then sub-domain may be advertisergroup1.adserver.example.com or advertisergroup3.adserver.example.com. In other implementations, the dynamically generated hostnames are distinct domain names (e.g., advertisergroup1.example.com or advertisergroup2.example.com). Typically, however, all of the dynamic hostnames identify the ad server. For example, the client would resolve both advertisergroup1.adserver.example.com and advertisergroup1.example.com to an IP (internet protocol) address of the ad server.

The dynamically generated hostname associated with each advertiser of the group is used when generating references to particular advertisements of the advertisers of the group. Each reference includes the generated hostname rather than the conventional hostname of the ad server. For example, if Acme Company is assigned to the dynamically generated hostname 'advertisergroup1.adserver.example.com', then a reference to an advertisement for Acme Company may be 'http://advertisergroup1.adserver.example/summersale.gif'. The references are provided to a publisher.

Typically, the publisher incorporates the reference in published content. The published content, including the reference, is downloaded and received by clients. Thus, the reference is provided to a client. The client uses the reference to request the advertisement from the ad server. In general, using the reference includes resolving an IP address based on the hostname, in particular the dynamically generated hostname, specified in the reference.

Hostname resolution can be carried out by the client in accordance with any pre determined process (e.g., DNS address resolution). Resolving the dynamically generated hostname can include requesting IP address resolution from a server associated with the domain name portion of the hostname. For example, to resolve advertisergroup1.adserver.example.com the server at adserver.example.com can be requested to provide an IP address. In some implementations, the ad server, or more generally a component of the ad server system, can respond to such requests. The ad server can respond to all requests for all dynamically generated hostnames that could potentially be generated (e.g., 'advertisergroup*.adserver.example.com'), including hostnames that have not yet been generated or associated with an advertiser. For example, the hostname noone.adserver.example.com can be resolved to a particular IP address, even if the hostname has not been dynamically generated or associated with a particular group of one or more advertisers.

A request for the advertisement can then be received from the client. The request includes the dynamically generated hostname of the reference (e.g., advertisergroup1.adserver.example.com). In some implementations, the hostname portion of the reference is provided with client's request automatically (e.g., as required by the hypertext transfer protocol (HTTP/1.1)). In other implementations, the reference can be provided in the path of the requested content (e.g., 'http://advertisergroup1.adserver.example/ad1.gif?q=acme').

If no other information is received with the request, the advertisement and an HTTP cookie is provided to the client. The HTTP cookie is hereafter referred to as a client cookie. The client cookie includes a payload consisting of a unique identifier (e.g., a number). The unique identifier is generated by the ad server. The ad server records the unique identifier and other information related to the request (e.g., the particular advertisement requested, the advertiser, the time and the publisher).

Typically, the client cookie is received, stored and associated with the generated hostname of the request by the client. Whenever the client makes a request that includes the generated hostname, the client cookie associated with the hostname is included in the request. Therefore, after having first received a client cookie with the unique identifier, the client provides the unique identifier in all subsequent requests that address the dynamically generated hostname. For example, the client cookie and its unique identifier is provided with any request for advertisements addressed to by the advertisergroup1.adserver.example.com hostname. In particular, the unique identifier is not provided by the client when requesting advertisements addressed to using other hostnames, which are presumably associated with other advertisers. The client is provided a distinct identifier for each cookie associated to each advertiser. Therefore, the client receives one identifier for advertisergroup1.adserver.example and a completely different identifier for advertisergroup2.adserver.example.

Figure 6:
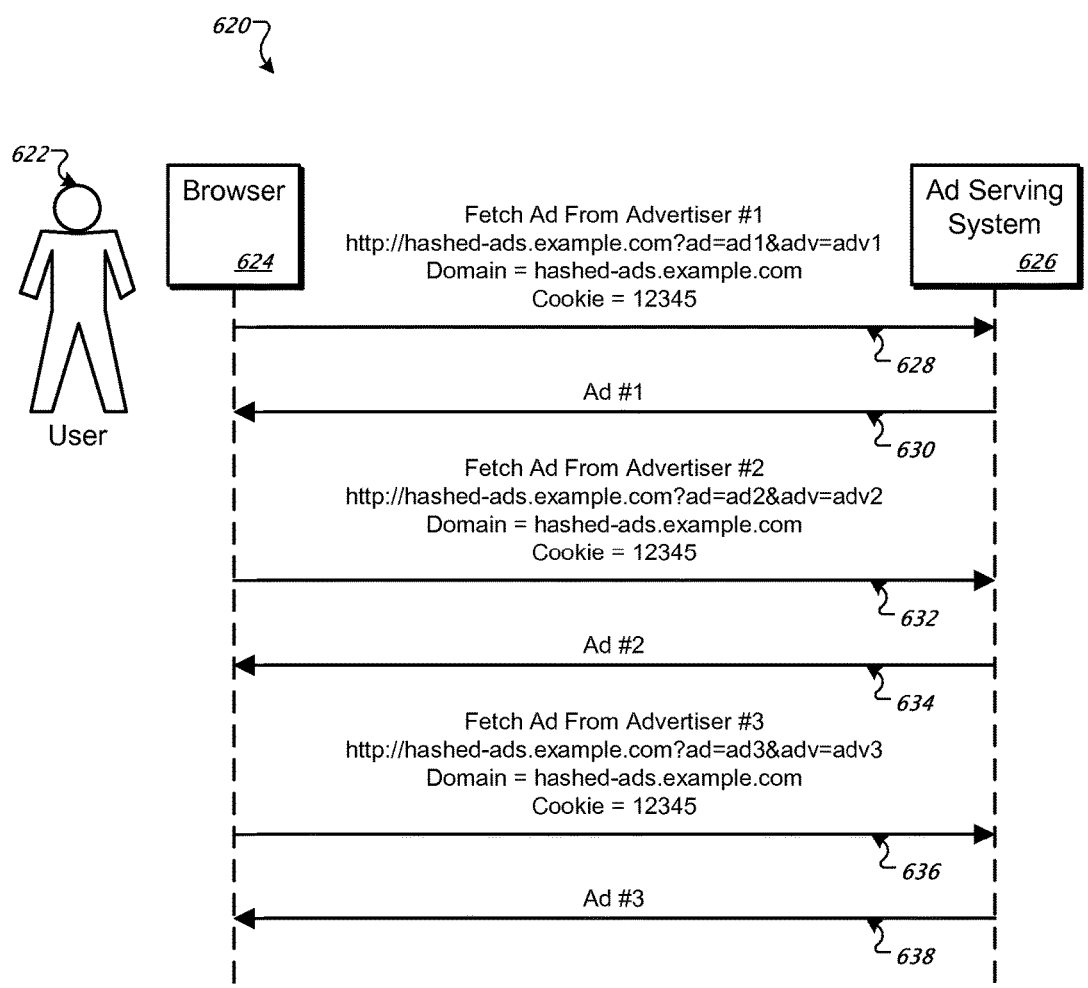
FIG. 6 shows an example process for associating a single cookie with a number of Internet advertisements that used hashed values.

FIGS. 5-7 illustrate the use of hashed values in an ad serving system 626. In some implementations, hashing is used to provide another technique for obscuring an ad history of individual browsers.

FIG. 5 shows a table 500 of exemplary values that may be used in a hashing process. The table 500 illustrates that a single cookie value can be combined with other information in a hashing process to determine a hashed value. For example, the cookie value may be combined with the identity of the advertiser, or other information that may be logged by an ad serving system. In some implementations, various hashing functions are used to determine the hashed value. For example, the hashed value can be determined by combining the cookie value with the identity of the ad, and applying a hashing function, e.g., SHA-1, SHA-224, SHA-256, SHA-384, or SHA 512, MD5, RIPEMD, WHIRLPOOL, or other hashing functions.

FIG. 6 shows an example process 620 for associating a single cookie with a number of Internet advertisements that used hashed values. For convenience, the process 620 is described with respect to an ad serving system 626 that will perform the process 620. The ad serving system 626 receives a request from a web browser 624 (e.g., interacting with a user 622) for an ad from advertiser #1. The request includes information that identifies the address "http://hashed-ads.example.com?ad=ad1&adv=adv1" of the web page that includes the ad. The request also includes the cookie value "12345" associated with the domain of the requested web page (e.g., "hashed-ads.example.com"). The ad serving system 626 responds 630 to the request by returning the requested ad #1 (e.g., the ad identified by "ad=ad1" in the web page address), and logs various information about the request such as the identity of the advertiser, the identity of the requested ad, and other data that may be used to record ad serving actions. An example of the types of information that may be logged will be described in further detail in reference to FIG. 7.

Similarly, the ad serving system 626 receives 632 a request from the browser 324 for an ad from advertiser #2 with the URL "http://hashed-ads.example.com?ad=ad2&adv=adv2." The domain "hashed-ads.example.com" is the same domain as was used in the request for ad #1, therefore the same cookie value "12345" is sent as part of the ad request. The ad serving system 626 responds 334 by returning the requested ad #2, and logs various information about the request, for example, the hashed cookie value (e.g., hash value 15500).

The ad serving system 626 receives 624 a request from the browser 624 for an ad from advertiser #3 at "http://hashed-ads.example.com?ad=ad3&adv=adv3." The domain "hashed-ads.example.com" is the same domain as was used in the request for ad #2. Therefore the same cookie value "12345" is sent as part of the ad request. The ad serving system 626 responds 638 by returning the requested ad #3, and logs various information about the request.

FIG. 7 shows an example web server log 760. The log 760 includes information that records the actions performed by the ad serving system 626 in response to requests for ads. The log 760 of this example includes several log entries, including a log entry 762, a log entry 764, and a log entry 766. The log entry 762 includes information recorded in response to the request for ad #1, such as the identity of advertiser #1 and the identity of the ad #1. The log entry also includes a hashed cookie value "15000." The hashed cookie value represents the value illustrated in the table 500, where the cookie value "12345" was hashed with the identity of advertiser #1 to obtain a hashed value of "15000." In some implementations, the hashing process is performed by the ad serving system 626 prior to recording a log entry for an ad serving action.

The entry 764 includes the identity of advertiser #2, and the value (e.g., "15500") obtained when the cookie value "12345" is hashed with the identity of advertiser #2. Similarly, the entry 766 includes the identity of advertiser #3, and the value (e.g., "16000") obtained when the cookie value "12345" is hashed with the identity of advertiser #3.

Figure 8:
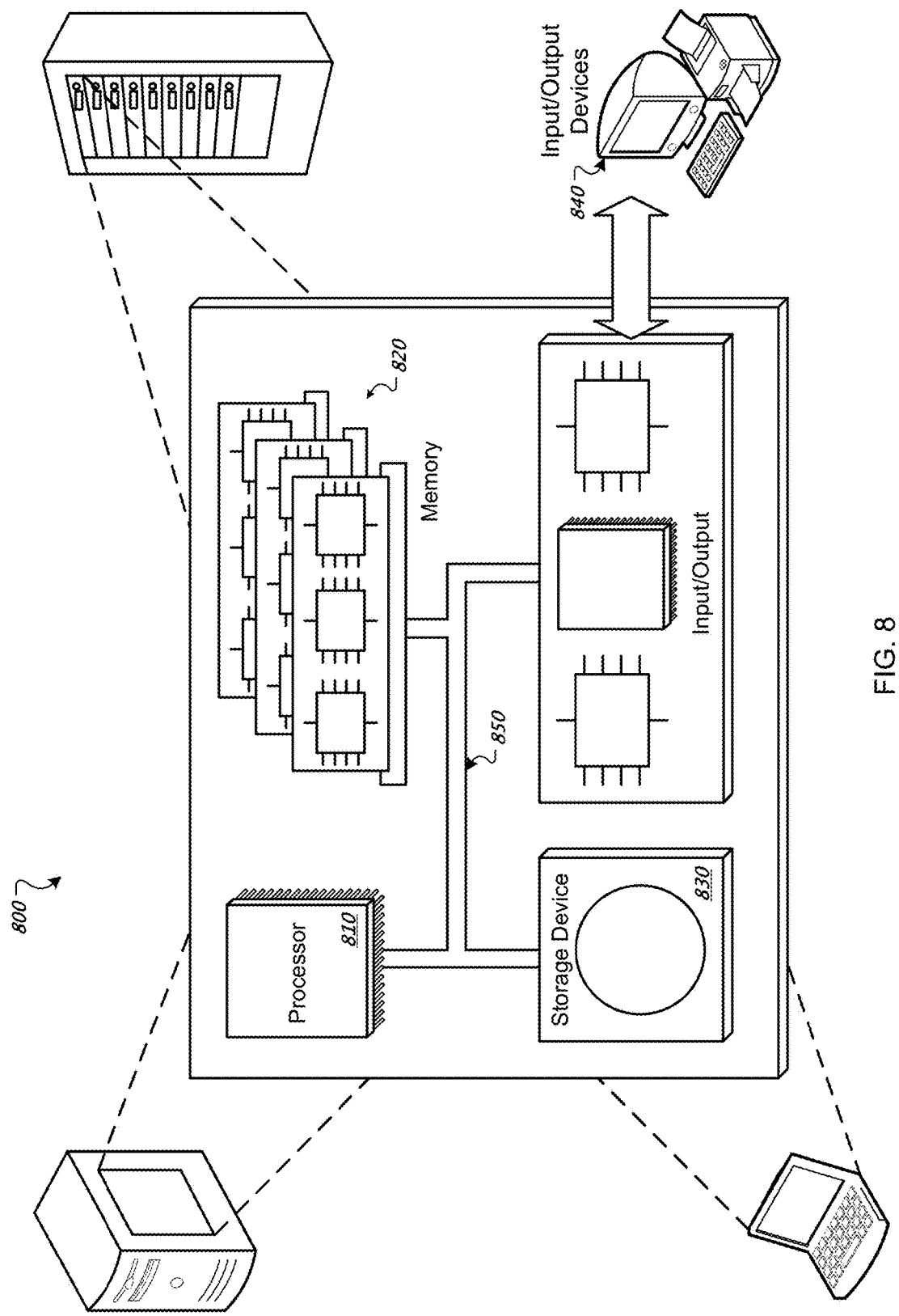
FIG. 8 shows a schematic diagram of an example computer system.

FIG. 8 shows a schematic diagram of an example computer system 800 is shown. The system 800 can be used for the operations described in association with the process 200 shown in FIG. 2 according to one implementation, or the process 400 shown in FIG. 4 according to another implementation. For example, one or more of the systems 800 can be used to implement a server hosting the ad serving systems 206 and 406.

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840. In some embodiments, a parallel processing set of systems 800 connected over a network may be employed, clustered into one or more server centers.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, or some other large capacity storage device.

The input/output device 840 provides input/output operations for the system 800. In one implementation, the input/output device 840 includes a keyboard and/or pointing device. In another implementation, the input/output device 840 includes a display unit for displaying graphical user interfaces.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving, by an ad server and from a client, a first request for a first advertisement from an advertiser associated with an advertiser group, the first advertisement being identified by a first reference to a hostname that identifies the ad server and the advertiser group;
   in response to the first request for the first advertisement from the advertiser, determining, based on the hostname, that the first request is associated with the advertiser group, and generating a first advertisement packet that includes the first advertisement and a client cookie associated with the advertiser group and the client, the first advertisement packet being of a first size;
   sending, to the client, the first advertisement packet;
   receiving, by the ad server and from the client, a second request for a second advertisement from a different advertiser associated with the advertiser group, the second advertisement being identified by a second reference to the hostname that identifies the ad server and the advertiser group;
   determining, by the ad server, that the advertiser group identified by the first reference matches the advertiser group identified by the second reference;
   determining, by the ad server, that the ad sever has previously sent, to the client, the client cookie associated with the advertiser group;
   based on determining that the advertiser group identified by the first reference matches the advertiser group identified by the second reference and determining that the ad server has sent, to the client, the client cookie associated with the advertiser group, generating a second advertisement packet that includes the second advertisement and does not include an additional client cookie, the first packet being of a second size that is smaller than the first size; and
   sending, to the client, the second advertisement packet.

2. The method of claim 1, wherein the hostname includes a domain that identifies the ad server.

3. The method of claim 1, wherein each client cookie is used to identify a corresponding client browser to a particular group of advertisers associated with the advertiser group, and a single client cookie is associated with multiple different advertisers in the particular group of advertisers such that a number of cookies associated with the particular group of advertisers is less than a number of different advertisers in the particular group of advertisers.

4. The method of claim 1, wherein the client cookie is logged to record activity of a particular client browser according to a particular group of advertisers identified by the client cookie.

5. The method of claim 1, further comprising:
   receiving, by the ad server and from the client, a third request for a third advertisement from an advertiser associated with a different advertiser group, the third advertisement being identified by a third reference to a different hostname that identifies the different advertiser group;
   determining, by the ad server, that the advertiser group identified by the first reference does not match the different advertiser group identified by the third reference;
   determining, by the ad server, that the ad sever has not previously sent, to the client, a client cookie associated with the different advertiser group;
   based on determining that the advertiser group identified by the first reference does not match the different advertiser group identified by the third reference and determining that the ad server has not previously sent, to the client, a client cookie associated with the different advertiser group, generating a third advertisement packet that includes the third advertisement and an additional client cookie that is configured to obfuscate an identity of the client based on an additional advertiser receiving the client cookie associated with the different advertiser group instead of the client cookie associated with the advertiser group, the third packet being of about the first size; and
   sending, to the client, the third advertisement packet.

6. The method of claim 1, further comprising:
   recording the second request including the client cookie; and
   using the recorded second request to derive advertising metrics for the advertiser group.

7. The method of claim 1, further comprising:
   recording request data for a plurality of requests, the request data for each request comprising a hostname identifying a particular advertiser group, and a client cookie specific to a particular client and the particular advertiser group; and
   using the request data to derive advertising metrics.

8. A tangible computer-readable medium storing software comprising instructions executable by one or more computers which, upon such execution, cause the one or more computers to perform operations comprising:
   receiving, by an ad server and from a client, a first request for a first advertisement from an advertiser associated with an advertiser group, the first advertisement being identified by a first reference to a hostname that identifies the ad server and the advertiser group;
   in response to the first request for the first advertisement from the advertiser, determining, based on the hostname, that the first request is associated with the advertiser group, and generating a first advertisement packet that includes the first advertisement and a client cookie associated with the advertiser group and the client, the first advertisement packet being of a first size;
   sending, to the client, the first advertisement packet;
   receiving, by the ad server and from the client, a second request for a second advertisement from a different advertiser associated with the advertiser group, the second advertisement being identified by a second reference to the hostname that identifies the ad server and the advertiser group;
   determining, by the ad server, that the advertiser group identified by the first reference matches the advertiser group identified by the second reference;
   determining, by the ad server, that the ad sever has previously sent, to the client, the client cookie associated with the advertiser group;
   based on determining that the advertiser group identified by the first reference matches the advertiser group identified by the second reference and determining that the ad server has sent, to the client, the client cookie associated with the advertiser group, generating a second advertisement packet that includes the second advertisement and does not include an additional client cookie, the first packet being of a second size that is smaller than the first size; and
   sending, to the client, the second advertisement packet.

9. The medium of claim 8, wherein the hostname includes a domain that identifies the ad server.

10. The medium of claim 8, wherein each client cookie is used to identify a corresponding client browser to a particular group of advertisers associated with the advertiser group, and a single client cookie is associated with multiple different advertisers in the particular group of advertisers such that a number of cookies associated with the particular group of advertisers is less than a number of different advertisers in the particular group of advertisers.

11. The medium of claim 8, wherein the client cookie is logged to record activity of a particular client browser according to a particular group of advertisers identified by the client cookie.

12. The medium of claim 8, wherein the operations further comprise:
    receiving, by the ad server and from the client, a third request for a third advertisement from an advertiser associated with a different advertiser group, the third advertisement being identified by a third reference to a different hostname that identifies the different advertiser group;
    determining, by the ad server, that the advertiser group identified by the first reference does not match the different advertiser group identified by the third reference;
    determining, by the ad server, that the ad sever has not previously sent, to the client, a client cookie associated with the different advertiser group;
    based on determining that the advertiser group identified by the first reference does not match the different advertiser group identified by the third reference and determining that the ad server has not previously sent, to the client, a client cookie associated with the different advertiser group, generating a third advertisement packet that includes the third advertisement and an additional client cookie that is configured to obfuscate an identity of the client based on an additional advertiser receiving the client cookie associated with the different advertiser group instead of the client cookie associated with the advertiser group, the third packet being of about the first size; and
    sending, to the client, the third advertisement packet.

13. The medium of claim 8, wherein the operations further comprise:

recording the second request including the client cookie; and using the recorded second request to derive advertising metrics for the advertiser group.

14. The medium of claim 8, wherein the operations further comprise:

recording request data for a plurality of requests, the request data for each request comprising a hostname identifying a particular advertiser group, and a client cookie specific to a particular client and the particular advertiser group; and using the request data to derive advertising metrics.

15. A system comprising:

one or more computers and one or more storage devices storing instructions that are operable, when executed by the one or more computers, to cause the one or more computers to perform operations comprising:

receiving, by an ad server and from a client, a first request for a first advertisement from an advertiser associated with an advertiser group, the first advertisement being identified by a first reference to a hostname that identifies the ad server and the advertiser group;

in response to the first request for the first advertisement from the advertiser, determining, based on the hostname, that the first request is associated with the advertiser group, and generating a first advertisement packet that includes the first advertisement and a client cookie associated with the advertiser group and the client;

sending, to the client, the first advertisement packet;

receiving, by the ad server and from the client, a second request for a second advertisement from a different advertiser associated with a different advertiser group, the second advertisement being identified by a second reference to a different hostname that identifies and the different advertiser group;

determining, by the ad server, that the advertiser group identified by the first reference does not match the advertiser group identified by the second reference;

determining, by the ad server, that the ad sever has not previously sent, to the client, a client cookie associated with the different advertiser group;

based on determining that the advertiser group identified by the first reference does not match the different advertiser group identified by the second reference and determining that the ad server has not previously sent, to the client, the client cookie associated with the different advertiser group, generating a second advertisement packet that includes the second advertisement and an additional client cookie that is configured to obfuscate an identity of the client based on the different advertiser receiving the client cookie associated with the different advertiser group instead of the client cookie with the advertiser group; and sending, to the client, the second advertisement packet.

16. The system of claim 15, wherein the hostname includes a domain that identifies the ad server.

17. The system of claim 15, wherein each client cookie is used to identify a corresponding client browser to a particular group of advertisers associated with the advertiser group, and a single client cookie is associated with multiple different advertisers in the particular group of advertisers such that a number of cookies associated with the particular group of advertisers is less than a number of different advertisers in the particular group of advertisers.

18. The system of claim 15, wherein the client cookie is logged to record activity of a particular client browser according to a particular group of advertisers identified by the client cookie.

19. The system of claim 15, wherein the operations further comprise:

recording request data for a plurality of requests, the request data for each request comprising a hostname identifying a particular advertiser group, and a client cookie specific to a particular client and the particular advertiser group; and using the request data to derive advertising metrics.

* * * * *